A. J. HAMMA.
MACHINE FOR SPONGING AND FINISHING FABRICS.
APPLICATION FILED SEPT. 2, 1908.
954,861.
Patented Apr. 12, 1910.
5 SHEETS—SHEET 2.
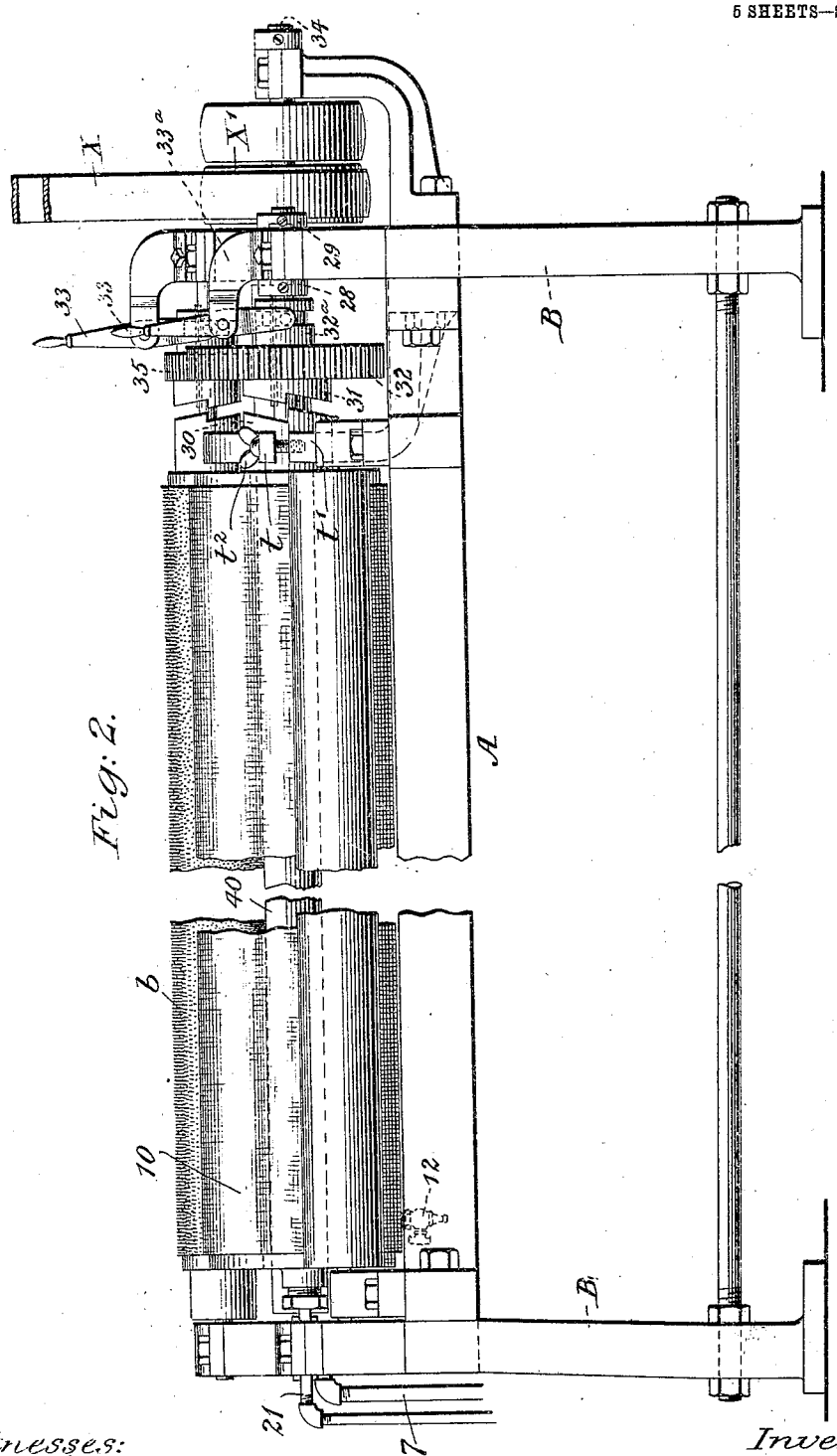
Witnesses:
J. A. Rennie
B. J. Rennie
Inventor:
Adolph J. Hamma

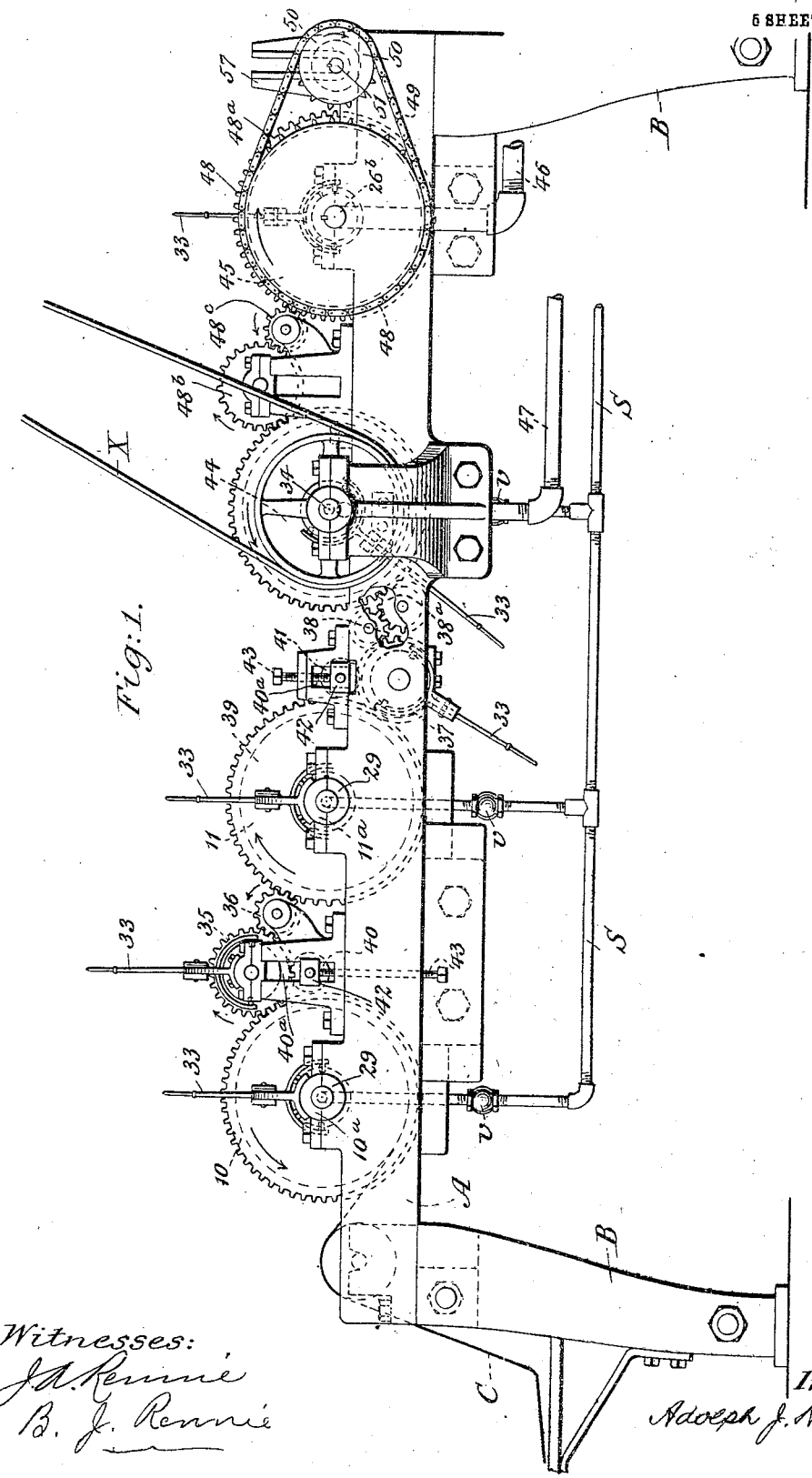

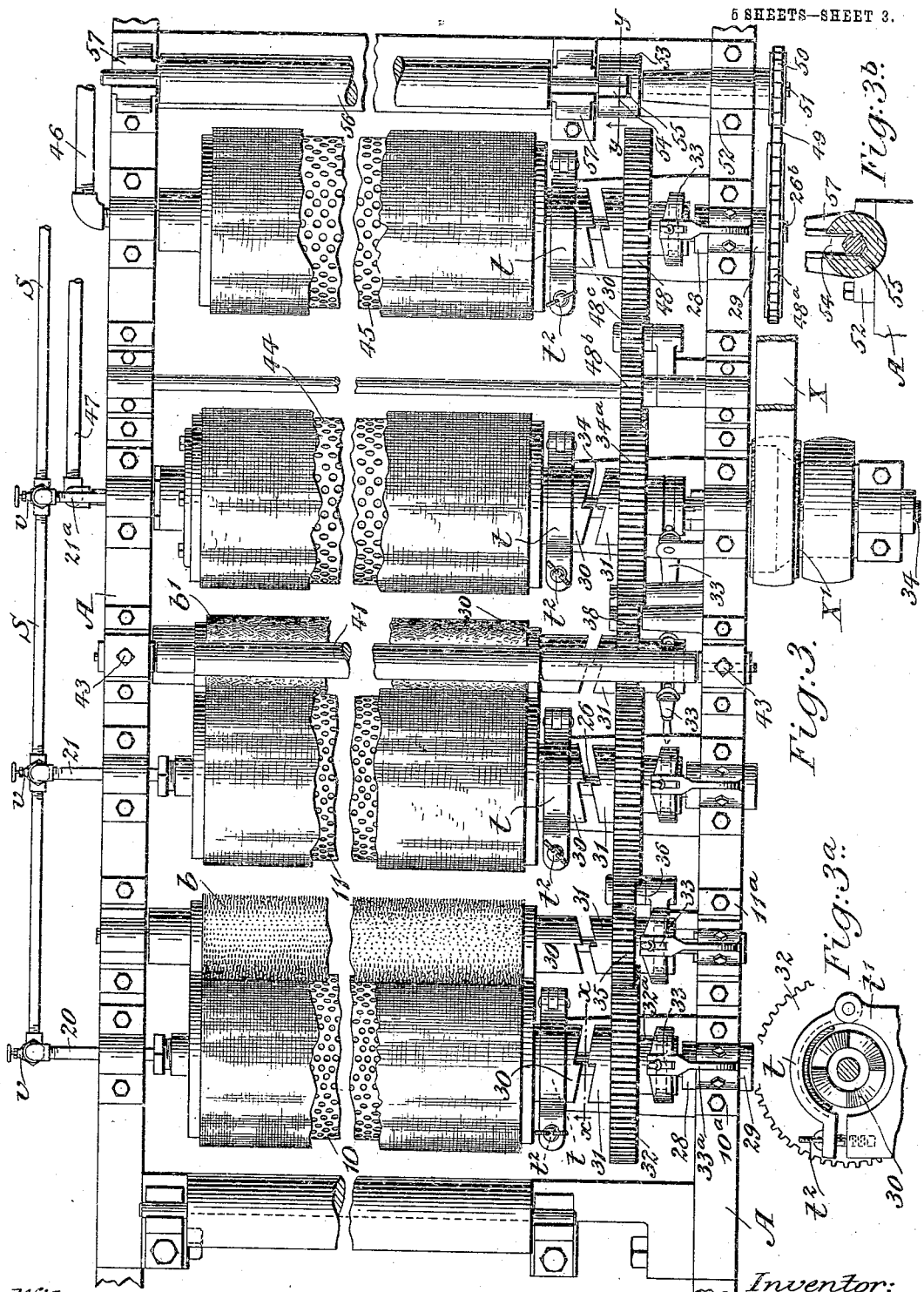

A. J. HAMMA.
MACHINE FOR SPONGING AND FINISHING FABRICS.
APPLICATION FILED SEPT. 2, 1908.
954,861.
Patented Apr. 12, 1910.
5 SHEETS—SHEET 4.
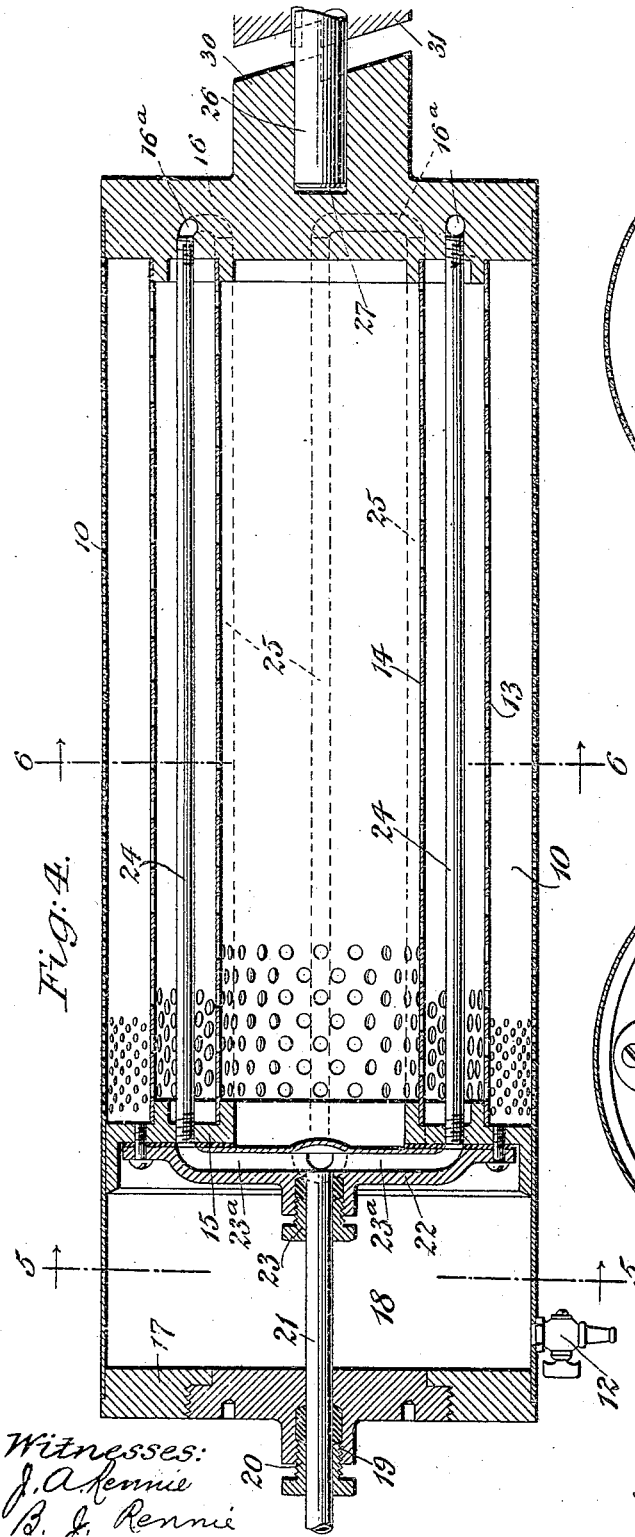
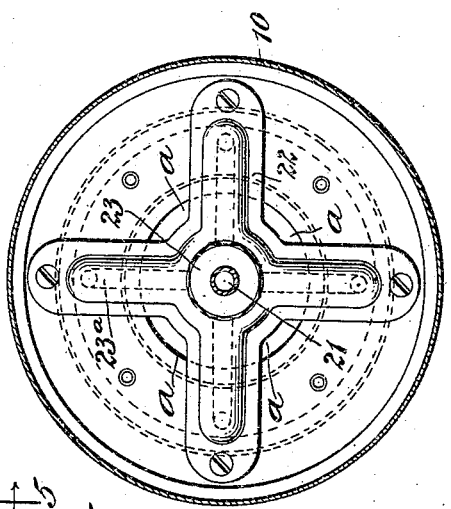
Witnesses:
J. A. Rennie
B. J. Rennie
Inventor:
Adolph J. Hamma A. J. HAMMA.
MACHINE FOR SPONGING AND FINISHING FABRICS.
APPLICATION FILED SEPT. 2, 1908.
954,861.
Patented Apr. 12, 1910.
5 SHEETS—SHEET 5.
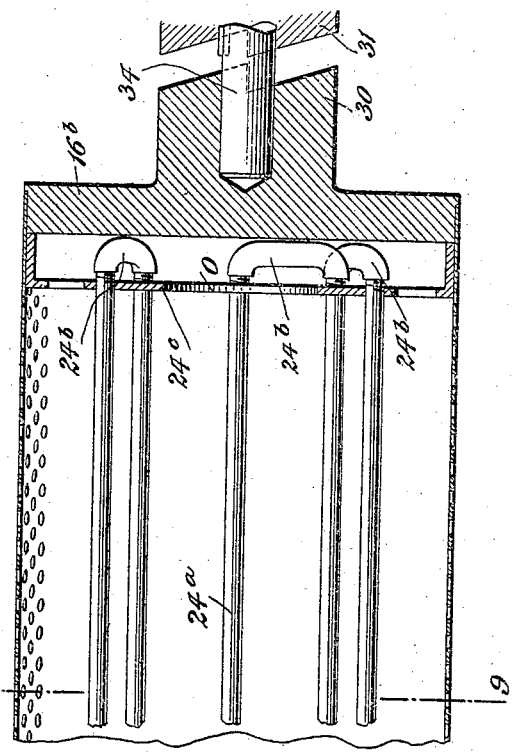
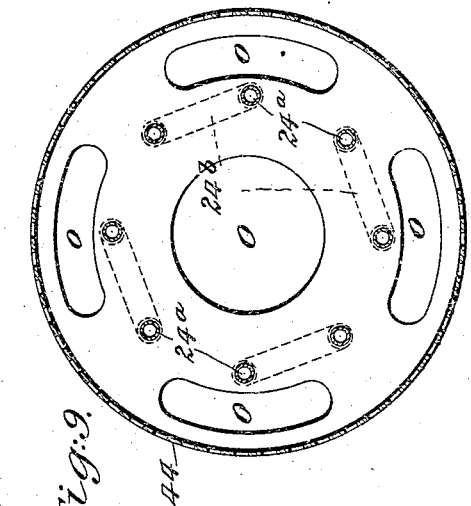
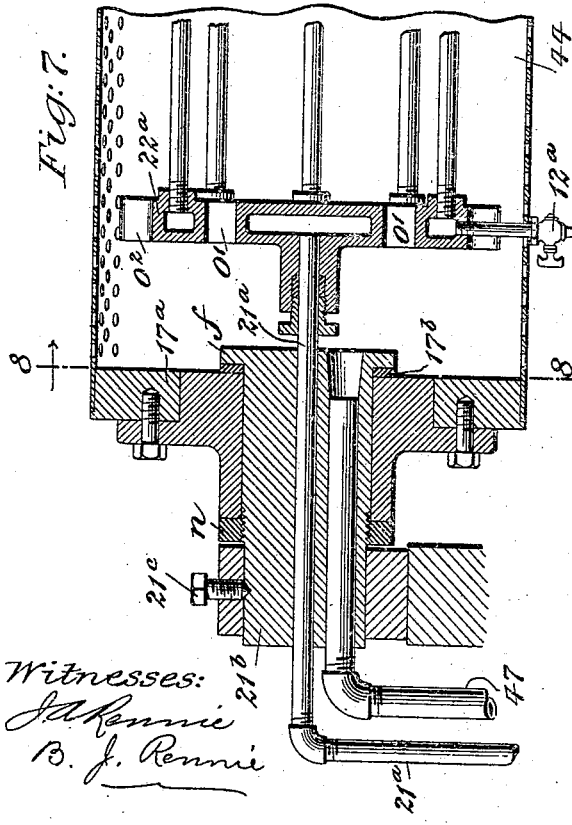
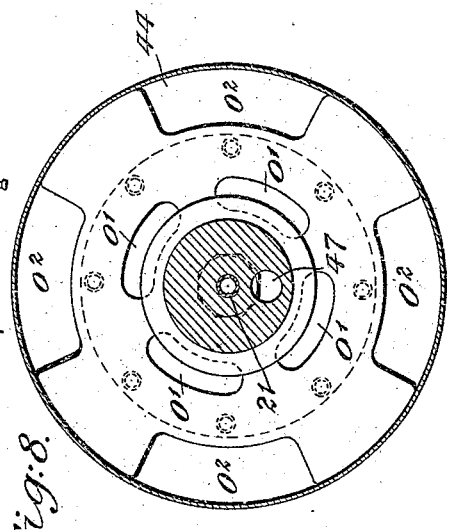
Witnesses:
J. A. Rennie
B. J. Rennie
Inventor:
Adolph J. Hamma

UNITED STATES PATENT OFFICE.

ADOLPH J. HAMMA, OF DELAWANNA, NEW JERSEY.

MACHINE FOR SPONGING AND FINISHING FABRICS.

954,861.  Specification of Letters Patent.  Patented Apr. 12, 1910.

Application filed September 2, 1908. Serial No. 451,344.

*To all whom it may concern:*

Be it known that I, ADOLPH J. HAMMA, a citizen of the United States, and a resident of Delawanna, in the county of Passaic and State of New Jersey, have invented certain new and useful Improvements in Machines for Sponging and Finishing Fabrics, of which the following is a specification.

My invention relates to machines for sponging and finishing cloths, an object being to provide a machine of this character, which shall be simple and inexpensive in construction, and by which the cloths will be subjected first, to a process of steaming; second to a process of dry heating, and finally to a process of cooling, which latter process completes the finishing of the cloth.

My invention contemplates the use of means for treating the nap of the cloths as they are successively subjected to the process of steaming, dry heating and cooling, the object being to so affect the nap that it will be uniformly spread and laid over and upon the body of the cloths, thereby producing better finished surfaces than have heretofore been accompanied by the processes at present in use.

My invention may be said to comprise a plurality of cylinders having perforated surfaces and adapted to receive steam, hot and cold air, and means which may comprise a plurality of brushes of more or less degrees of fineness which are designed to act upon the nap of the cloth to spread and lay it naturally and uniformly over the surface thereof.

My invention further comprises means for throwing into and out of operation any one, or all of the cylinders, as may be found necessary in the operation of the machine, as well as the simple means for preventing any condensation of steam that may take place in the steam cylinders from passing out to the exterior of the steam cylinders, which is one of the important features of the present invention.

My invention further comprises certain novel features of construction and arrangement of parts, all of which will be hereinafter more fully described.

I will describe a preferred embodiment of my invention and then point out the novel features thereof in claims.

In the accompanying drawings, Figure 1, represents a side elevation of a cloth sponging and finishing machine embodying my invention. Fig. 2, is a front elevation thereof. Fig. 3, is a plan view. Figs. 3$^a$ and 3$^b$, are detail sectional views taken, respectively, on the lines $x$, $x$, and $y$, $y$, of Fig. 3. Fig. 4, is a central longitudinal section of one of the steam cylinders. Figs. 5 and 6, are transverse sections taken, respectively, on the lines 5, 5, and 6, 6, of Fig. 4. Fig. 7, is a central longitudinal section of the hot air cylinder. Figs. 8 and 9, are transverse sections taken, respectively, on the lines 8, 8, and 9, 9, of Fig. 7.

Similar reference characters designate like parts in all the figures of the drawing.

Referring to said drawings, A, designates a suitable frame-work supported, as shown, on the legs B, which may be made integral therewith, or bolted thereto, as may be found most desirable or convenient.

10 and 11 designate respectively, two perforated steam cylinders, arranged in parallel relation with each other and supported in bearings 10$^a$ and 11$^a$, located at the front end of the machine—these cylinders are preferably arranged to revolve in an inclined plane, with respect to the horizontal, in order that all condensation within the cylinder may drain toward the lowermost ends thereof, where it may be drawn off by convenient drip cocks 12—any number of these drip cocks 12, may be provided, but for purposes of illustration I have only shown one for each cylinder.

As both of the steam cylinders 10 and 11, are constructed on the same lines, a description of one will suffice, the same reference characters being used for each cylinder.

Referring to Figs. 4, 5, and 6, it will be noted that the cylinder is composed of a series of perforated shells 10, 13 and 14, the two inner shells 13 and 14, being supported, at one end, in a head 15, located within the outer shell 10, and at their other ends in a head 16, which forms a closure for one end of the outer shell 10. The opposite end of the outer shell 10, is secured to a head 17, which is located at a suitable distance away from the head 15, to provide what may be termed a steam chamber 18, within the cylinder. The head 17, is provided with a threaded opening, which receives a threaded bushing 19, the latter being provided with an opening and packing gland 20, through which a steam supply pipe 21, passes to, and connects with, a steam jacket 22.

The steam jacket 22, may be of any desired form or construction, and, as here shown, it is preferably made in the form of a casting having a central opening therein and a packing gland 23, to receive the end of the steam supply pipe 21, and branches 23ª having ports therein that lead to a coil of steam pipes 24. The coil of pipes 24, may be made up in any approved manner, but I prefer to provide each of the heads 15 and 16, with threaded openings into which the threaded extremities of each of the pipes comprised in the coil is screwed; each end of four of such pipes connecting with the ports 23ª and their other ends communicating through curved passages 16ª, in the head 16, with the other pipes 25, in the coil, the opposite extremities of which terminate in the head 15, and communicate with the chamber 18. Thus when steam is introduced into the cylinder 10 or 11, as the case may be, it will first pass into the steam jacket 22, thence through those pipes which communicate with the curved passages 23ª, through the parts 16ª, back through the remaining pipes 25 of the coil and into the chamber 18, whence it will pass through the apertures $a$ into the body portion of the cylinder and finally out through the perforations in the shells 14, 13 and 10 to the exterior of the cylinder.

As before mentioned, condensation may be readily drawn off through the drip cock 12, although it will be obvious that little or no condensation will take place owing partially to the fact that the steam from the chamber 18, becomes superheated as it contacts with the steam pipes in the coil 24 in its passage out toward the exterior of the cylinder, and partially to the intense heat generated in the cylinder, which will thus minimize such condensation.

The pipe 21, forms the axis for one end of the steam cylinders, and the axis for the other end may be a short shaft 26, one end of which rests within a socket 27, in the head 16, and the other end of said shaft being held in the bearings 10ª and 11ª in the frame of the machine. Suitable collars 28, 29, are mounted on the shaft at each side of its bearing to maintain it in proper position and prevent lengthwise movement thereof.

Motion is imparted to the cylinders through the medium of a train of gears and clutch mechanisms to be described, and when the cylinders are not being rotated, the clutch mechanisms are thrown out of action, permitting the operator to turn the cylinders upon their axes, or to otherwise manipulate them by hand, so as to properly adjust the cloth thereon, or to prepare for the removal of the cloth therefrom.

30 designates one member of a clutch which may be secured to, or form part of, the head 16, and 31, designates the other clutch member which is splined on the shaft 26, and is therefore capable of lengthwise as well as rotative movement—to engage or disengage it with the clutch member 30.

The clutch member 31 may be formed on the hub of a gear wheel 32, or it may be otherwise arranged so as to move and revolve with it, and the opposite side of the gear is provided with an annularly-grooved hub 32ª adapted to receive the bifurcated ends of a hand lever 33, the latter being pivotally supported in a bracket 33ª, secured to the frame of the machine.

The gear wheel 32, receives its motion through the medium of a train of gears driven from a main shaft 34, and being constantly in motion, it is obvious that by moving the lever 33, to the right, as viewed in Fig. 2, the gear 32 and clutch member 31, will be moved into position for the latter to engage the clutch member 30, thereby imparting rotary motion to the cylinder 10, in the direction of the arrow shown in Fig. 1.

As the operation of the several cylinders are alike in every respect, except that each successive cylinder may, and in my present invention does revolve in opposite directions, and the clutch mechanisms being also similar in construction and operation, I have deemed the above description of one sufficient for all, and will use the same reference characters to designate like parts throughout.

$b$ and $b'$ designate respectively two brushes for acting upon the nap of the cloth, the former being arranged adjacent the cylinder 10, and being preferably composed of coarse material, and the latter being arranged adjacent the cylinder 11, and being composed of comparatively finer material such for example as velour or the like—the said brushes being preferably made cylindrical in form and being rotated by the small gears 35, 36 and 37, 38 and 38ª interposed respectively between, and meshing with the gear wheel 32, on the shaft 26, and a similar gear wheel 39, which latter co-acts with and gives motion to the cylinder 11.

40, 41 designate tension rollers, the former being shown as arranged below the brush $b$, and the latter above the brush $b'$. Both rollers are carried in movable journal boxes 42, arranged in guideways 40ª, secured to the frame of the machine, and through the medium of screws 43, are made adjustable to and from the respective brushes $b$, $b'$, whereby the friction of the brushes on the cloth may be regulated in order to have them affect the nap thereon to produce the desired results.

44, 45 designate respectively, a hot, and a cold air cylinder, the latter having a perforated surface and receiving a supply of cold air through a pipe 46, and the former also having a perforated surface and receiving its supply of hot air through a pipe 47, both pipes being primarily charged from any convenient sources, neither of which is shown.

The hot air cylinder 44, is illustrated clearly in Figs. 7, 8 and 9 to which reference is directed.

In order to intensify and soften the hot air in the cylinder 44, I may employ a coil of pipes $24^a$, and the construction of the head $16^b$ of the cylinder, may be similar in every respect to the heads 16 of the steam cylinders 10 and 11, but I prefer to omit the ports $16^a$ therein, and to connect the inner ends of the pipes, comprised in the coil, with elbows $24^b$ and secure the opposite ends of the pipes in a steam jacket $22^a$, which latter receives its steam supply through a pipe $21^a$ as shown.

The inner ends of the pipes $24^a$, are preferably passed through perforations in a plate $24^c$, which thus provides a substantial support for the coil at that end, and said plate $24^c$, is provided with orifices $o$, through which the hot air may freely circulate into the cylinder. The steam jacket $22^a$, is also provided with orifices $o'$, and with peripheral interstices $o^2$, through which the hot air from the pipe 47 may freely pass into the cylinder. Condensation within the pipes $24^a$, and steam jacket $22^a$, may be drawn off through the drip cock $12^a$, which leads from the steam jacket $22^a$, to the outside of the cylinder, as shown.

The cylinder 44, is supported at one end upon the main shaft 34, and the head $16^b$ is provided with a clutch member 30, to be engaged by a co-acting clutch member 31, as previously described. A gear wheel $34^a$, forms part of the clutch member 31, and meshes with the gear wheel $38^a$, and thus imparts motion to the train of gears which operate the cylinders 10 and 11, and the brushes $b$, $b'$ previously described. The other end of the cylinder 44, is supported on a bushing $21^b$, secured to the frame of the machine in any convenient manner, as by a screw $21^c$. The bushing is bored, as shown, to provide openings for the reception of the steam and hot air supply pipes $21^a$ and 47, and its inner end is flanged at $f$, to receive between said flange and the head $17^a$, a gasket or packing ring $17^b$, which may be compressed by a nut $n$, on the threaded portion $n'$, of the bushing $21^b$. This arrangement effects a comparatively tight joint between the movable and stationary parts.

S designates the main steam supply which leads from any convenient source of supply, not shown, and the branches 20, 21 and $21^a$, lead therefrom into the respective cylinders 10, 11 and 44, each branch pipe being provided with a valve $v$, for controlling the passage of steam into the coils 24, $24^a$.

The brushes $b$, $b'$, are each provided with a clutch mechanism similar in every respect to the clutch mechanisms described in connection with the steam, and hot and cold air cylinders, and the same reference characters are employed to designate the several parts thereof. By this means I am enabled to control the operation of the brushes, as, under certain conditions, it may not be necessary to use a brush at all in the treatment of certain cloths.

The shaft $26^b$, which supports one end of the cold air cylinder 45, has in addition to a gear wheel 48, which forms part of the clutch member 31, and which derives motion from the gear wheel $34^a$, through the intermediate gear wheels $48^b$, $48^c$, mounted upon it, a sprocket wheel $48^a$, over which a sprocket chain 49, passes to and over a sprocket wheel 50 secured to a shaft 51, carried in a bearing 52, on the frame of the machine. The other end of the shaft 51, is provided with a head 53 in which a socket 54, is provided for the reception of the flattened end 55 of the shaft of a roller 56, removably supported in open bearings 57. This roller receives the cloth after it has been finished by the machine, and, after being wound thereon, may readily be removed and replaced by another one as quickly as the cloths are finished.

The flattened end 55, of the shaft may be hexagonal in form, as shown in Fig. $3^b$, in order that it may the more readily be slipped into and between the side walls of the socket 54.

The cloth as it is fed to and wound upon the several rollers may require more or less tension to be exerted upon it, in order that it may be spread out evenly thereover, as well as to prevent all possibility of wrinkling, and for that purpose I provide tension devices $t$, which as here shown, may comprise straps pivotally connected to brackets $t'$, secured to the frame of the machine. These straps partially surround each of the clutch members 30, of the cylinders 10, 11, 44 and 45, and a manipulation of screws $t^2$, will move the straps $t$, to exert more or less tension on the clutch members 30, and thereby regulate the resistance to be offered to the cloth as it discharges from one roller onto the other. This tension device is clearly illustrated in detail in Fig. $3^a$.

The operation of my invention is as follows:—The belt X being moved to the fast pulley X' and the gears set in motion, the operator adjusts the cloth to be treated onto the first steam cylinder 10, with what is termed the head end or back of the cloth upon the periphery of the cylinder, and then throws in the clutch mechanism which causes the cylinder 10, to revolve and wind upon it the cloth, designated C, Fig. 1. After the cloth has been fully wound onto this cylinder, steam is admitted therein, which, after passing up through the perforations therein and the external covering, finds its way out to and through the cloth. Steam is then shut off, and then what is termed the board end of the cloth is passed between the roller 40 and the brush $b$, thence over to the second steam cylinder 11, whereupon the second clutch mechanism is thrown into operation, causing the cloth to be wound upon the cylinder 11, during which operation the brush $b$, which is revolving in an opposite direction to the travel of the cloth, acts upon the nap, as previously described, which nap runs from the board to the head end, and when the cloth is fully wound upon the cylinder 11, steam is admitted therein and the process of steaming the cloth, similar to that first described, is repeated. Another bolt of cloth may be, at this time, wound upon the first cylinder 10, to be ready for the second cylinder 11, when the latter has discharged a bolt already steamed. The steam is now shut off from the cylinder 11, and simultaneously admitted to the cylinder 10, and the cloth from the cylinder 11, is guided between the roller 41, and the softer brush $b'$, which latter revolves in the same direction of travel of the cloth, but more rapidly, and further acts upon it to lay the nap. The cloth is then adjusted to the third or hot air cylinder 44, upon which it is wound, whereupon hot air and steam are admitted therein, and, after the cloth has been sufficiently heated, both steam and hot air are turned off and the cloth is then passed onto the fourth or cold air cylinder 45, upon which it is wound, by throwing its clutch mechanism into operation, and when sufficiently cooled off is passed to the roller 56, on which it is also wound. The cloth being thus finished the roller 56, may then be removed and replaced with another one. In this manner the process of sponging and finishing cloth is in constant operation, it being apparent that when the cloth has been properly steamed and then removed from the first cylinder 10, another bolt may be wound thereon, and this process continued until each piece of cloth has passed successively to the action of the cylinders 11, 44, 45 and wound on roller 56, as previously described.

Having thus described my invention, what I claim and desire to secure by Letters Patent is as follows:—

1. In a machine for sponging cloth, a rotatable steam-cylinder comprising a plurality of concentrically-arranged, perforated shells, closed at one end by a common head, the opposite ends of the inner shells being supported by a suitable head; a steam-jacket secured to said supporting head and forming a closure for the inner shells; a suitable head closing the end of the outer shell; a steam-chamber formed between said head and the steam-jacket; a pipe for supplying steam to said steam jacket; steam-pipes communicating with the steam-jacket, and return steam-pipes communicating with the steam-chamber, as and for the purpose specified.

2. In a machine for sponging cloth, a rotatable steam-cylinder comprising a plurality of concentrically-arranged, perforated shells, closed at one end by a common head; a head supporting the opposite ends of the inner shells, a steam-jacket secured to said supporting-head and forming a closure for the inner shell; a head closing the opposite end of the outer shell; a steam-chamber formed between said head and the steam-jacket; a pipe for supplying steam to said steam-jacket; steam-pipes communicating with the steam-jacket and passing between the inner shells, and return steam-pipes communicating with the steam-chamber, whereby steam admitted to the steam-jacket and conveyed through the shells may be returned to the steam-chamber.

Signed at New York in the county of New York and State of New York this 25th day of August A. D. 1908.

ADOLPH J. HAMMA.

Witnesses:
  J. SCHWARZKOPF,
  PHILIP L. PINCRES.